United States Patent [19]

Itoh et al.

[11] Patent Number: 4,902,732

[45] Date of Patent: Feb. 20, 1990

[54] EPOXY RESIN-BASED CURABLE COMPOSITIONS

[75] Inventors: Kunio Itoh, Gunma; Sumiko Komiya, Kumamoto; Toshio Shiobara, Gunma; Kazutoshi Tomiyoshi, Gunma; Yoshio Fujimura, Gunma, all of Japan

[73] Assignee: Shin-Etsu Chemical Co., Ltd., Tokyo, Japan

[21] Appl. No.: 928,654

[22] Filed: Nov. 5, 1986

Related U.S. Application Data

[63] Continuation-in-part of Ser. No. 781,533, Sep. 30, 1985, abandoned, which is a continuation-in-part of Ser. No. 606,703, May 3, 1984, abandoned, which is a continuation-in-part of Ser. No. 404,890, Aug. 3, 1982, abandoned.

[51] Int. Cl.$^4$ .................... C08L 63/04; C08L 83/10
[52] U.S. Cl. .................... 525/433; 523/435; 523/436
[58] Field of Search ............ 523/433, 435; 525/90, 525/476, 482, 487

[56] References Cited

U.S. PATENT DOCUMENTS

| | | | |
|---|---|---|---|
| 3,407,169 | 10/1968 | Johnson et al. | 525/487 |
| 3,691,257 | 9/1972 | Kendrick et al. | 525/90 |
| 4,022,753 | 5/1977 | Lohse et al. | 525/487 |
| 4,260,725 | 4/1981 | Keogh et al. | 525/479 |

FOREIGN PATENT DOCUMENTS 6160054 12/1981 Japan ..................... 523/435

*Primary Examiner*—Wilbert J. Briggs, Sr.
*Attorney, Agent, or Firm*—Jules E. Goldberg

[57] ABSTRACT

The present invention provides a novel epoxy resin-based curable composition suitable for use as an encapsulating resin composition for semiconductor devices capable of being highly resistant against crack formation with low internal stress by curing and yet having very high heat conductivity and maintaining high glass transition temperature. The inventive composition comprises (a) 100 parts by weight of a curable epoxy resin blend which is a mixture of an epoxy resin and a curing agent therefor, (b) from 5 to 100 parts by weight of a block copolymer composed of at least one segment of an aromatic polymeric moiety, phenyl novolac, and at least one segment of an organopolysiloxane moiety having 30 to 200 silicon atoms and bonded to the aromatic polymeric moiety through a carbon-to-silicon linkage, and optionally (c) an inorganic filler which is preferably a silica filler such as powdered quartz in an amount not exceeding 1000 parts by weight.

13 Claims, No Drawings

EPOXY RESIN-BASED CURABLE COMPOSITIONS

This is a continuation of application Ser. No. 781,533, Sept. 30, 1985, now abandoned, which, in turn, is a continuation-in-part of application Ser. No. 606,703, filed May 3, 1984, now abandoned, which, in turn is a continuation-in-part of application Ser. No. 404,890, filed Aug. 3, 1982, now abandoned.

BACKGROUND OF THE INVENTION

The present invention relates to an epoxy resin-based curable composition capable of giving cured products having excellent mechanical and electric properties and resistance against water as well as remarkably improved resistance against formation of cracks with a glass transition temperature not lower than in conventional epoxy resin-based cured products. In particular, the invention relates to and provides a basic formulation of an epoxy resin-based curable composition capable of giving a cured product having remarkably improved resistance against formation of cracks with low internal stress as are the essential requirements in the resin compositions suitable for packaging or encapsulation of electric or electronic parts and devices.

As is well known, a variety of resin compositions are currently used for the plastic packaging or encapsulation of electric or electronic parts and devices including the compositions formulated with the base resins of, for example, thermosetting resins such as epoxy resins, silicone resins, polybutadienes, polyurethanes, phenolic resins and the like as well as various thermoplastic resins utilizing their respective advantageous properties according to the desired applications.

Among the above named resin compositions, those based on an epoxy resin are used most widely and in the largest quantities by virtue of their excellent mechanical and electric properties, heat resistance and adhesion as well as their good workability or moldability. In particular, epoxy resin-based curable compositions predominantly occupy an outstanding position by virtue of the excellent performance thereof as a resin composition for encapsulation of semiconductor devices such as diodes, transistors, ICs, LSIs and the like under rapid technical growth in recent years.

Even though the epoxy resin-based curable compositions have been hitherto quite satisfactory in almost all respects as an encapsulating resin composition, there is a growing demand for an epoxy resin-based curable composition having more and more improved performance to comply with the development of the technology of electronics or, in particular, the trend of thinner and thinner or smaller and smaller design of the electronic devices and the increase in the density of integration as in LSIs. Accordingly, the conventional epoxy resin-based curable compositions are already not always quite satisfactory materials to meet such high-grade requirements in the modern electronics technology.

That is, improvements are desired for epoxy resin-based curable compositions in several aspects including, for example, higher and higher purity to prevent contamination of the semiconductor devices, higher electric performance as a matter of course, improved moldability to ensure shortened molding cycles contributing to the increased productivity, higher heat conduction or heat dissipation to ensure applicability to high-power devices, lower stress in the cured product to protect the encapsulated electronic device from an excessive physical stress and increased resistance against formation of cracks to withstand any severe thermal and mechanical shocks. Needless to say, many attempts have been undertaken to obtain epoxy resin-based curable compositions improved in these respects but particular difficulties are encountered in obtaining compatibility between the higher heat conductivity and the improved resistance against crack formation or decreased stress without adversely affecting the other characteristics so that no epoxy resin-based curable compositions have not yet been developed as imparted with the above described improved properties in combination to be a promising encapsulating resin composition in modern electronics industry.

Most of the epoxy resin-based curable compositions currently on use for the encapsulation of semiconductor devices are formulated with a bisphenol-type epoxy resin or a novolactype epoxy resin as the base component filled with a large volume of a crystalline or amorphous silica filler together with a crosslinking or curing agent to effect crosslinking of the polymer molecules with heating.

Although it is a relatively easy matter to satisfy either one of the above described requirements alone, it is sometimes rather a formidable problem to obtain improvement of the performance of the resin compositions in one particular point without sacrifice of one or more of the other properties and the requirements for different properties are sometimes incompatible with each other so that mere extension of hitherto undertaken way of investigations is of power no more.

For example, it is a conventional measure hitherto undertaken when improvements in the decreased stress and increased resistance against crack formation are desired to formulate the epoxy resin-based composition with a flexibility-improver such as 1,4-butanediol, polyoxyalkylene ether glycol, glycerin, polysulfide polymer, polyoxyalkylene glycidyl ether and the like but formulation of these additives is always accompanied by lowering of the glass transition temperature and decrease in the heat resistance as well as resistance against moisture or water. On the other hand, improvement in the heat conductivity is readily achieved by formulating the resin composition with a large volume of powdery crystalline silica alone as the filler though with unavoidable problems of decreased resistance against crack formation and larger stress or a coefficient of thermal expansion. In short, extreme difficulties are encountered in solving the above mentioned problem of obtaining compatibility in the improvements in respects of the high heat conductivity and resistance against crack formation as the largest requirements for the epoxy resin-based curable compositions insofar as the way of investigations is limited on the conventional route.

SUMMARY OF THE INVENTION

It is therefore the primary object of the present invention to provide a novel and improved epoxy resin-based curable composition suitable for use as an encapsulating resin composition of electronics or semiconductor devices to meet the very high performance requirements in the modern electronics technology.

A further object of the invention is to provide an epoxy resin-based curable composition capable of giving a cured product exhibiting remarkably low stress and high resistance against crack formation but yet having a very high glass transition temperature as being improved over conventional compositions in both of these two properties with compatibility.

Thus, the epoxy resin-based curable composition of the present invention developed as a result of the extensive investigations undertaken by the inventors to solve the above described difficult problems essentially comprises:

(a) 100 parts by weight of a curable epoxy resin blend composed of an epoxy resin and a crosslinking or curing agent therefor in such a proportion as to effect full curing of the epoxy resin, and (b) from 5 to 100 parts by weight of a block copolymer having at least one hydroxyl group or epoxy group reactive with the component (a) and composed of (b-1) at least one segment of an aromatic polymeric moiety containing at least two mono- to tetravalent aromatic groups bonded together mutually or through one or more of divalent linking units expressed by the formula $-(-CR_2-)_t-$, in which R is a hydrogen atom or a monovalent hydrocarbon group and t is a positive integer of 1 to 6, each of the mono- to tetra-valent aromatic groups being derived from a monocyclic aromatic compound with a single benzene ring devoid of 1 to 4 hydrogen atoms or substituent atoms or groups therefor directly bonded to the benzene ring, and (b-2) at least one segment of an organopolysiloxane moiety having from 30 to 200 silicon atoms in the polysiloxane linkage and expressed by the average unit formula

$$R^1{}_a SiO_{(4-a)/2},  \qquad (I)$$

in which $R^1$ is a monovalent organic group, at least 70 % in number of the groups $R^1$ being alkyl groups and a part of the groups $R^1$ optionally being hydrogen atoms, and a is a positive number in the range from 1.8 to 2.7, said segments (b-1) and (b-2) being bonded together through a silicon-to-carbon linkage, and (c) an inorganic filler in an amount in the range from 100 to 500 % by weight based on the total amount of the components (a) and (b).

The above defined aromatic polymeric moiety containing at least two mono- to tetravalent aromatic groups is preferably a phenol novolac or an epoxy phenol novolac.

It is further preferable that the above defined epoxy resin-based composition is filled with an inorganic filler in an amount of, for example, up to 500 parts by weight per 100 parts by weight of the curable epoxy resin blend as the component (a).

DETAILED DESCRIPTION OF THE PREFERRED EMBODIMENTS

As is proposed by some of the inventors in Japanese Patent Kokai 56-129246, organopolysiloxanes or, in particular, those having a linear molecular structure are promising modifiers for epoxy resin-based curable compositions to improve the flexibility or pliability of the cured products thereof in a wide range of temperature. This advantageous effect of organopolysiloxane is presumably due to the excellent heat resistance thereof with the extraordinarily high bond energy amounting to 106 kilocalories/mole of the siloxane linkages forming the skeletal structure of the molecule as well as the special interfacial property as a consequence of the flexibility of the siloxane chain with high rotatability of the siloxane linkages relative to each other.

Different from other kinds of flexibility-imparting agents for epoxy resins, furthermore, organopolysiloxanes are hardly miscible with the epoxy resin even at a considerably high temperature so that the glass transition temperature of the cured products of epoxy resin compositions is little decreased by compounding with an organopolysiloxane different from other kinds of flexibility-imparting agents which unavoidably cause a decrease in the glass transition temperature.

The above mentioned relatively low compatibility of an organopolysiloxane and an epoxy resin, on the contrary, sometimes causes another problem that high uniformity and stability of dispersion cannot always be expected between these components resulting in rather low mechanical strengths and high moisture permeation of the cured products of the resin composition although these defective points are not detrimental against the practical application of organopolysiloxanes as a modifier of epoxy resin-based curable compositions. This is presumably due to the good affinity of the organopolysiloxane molecules to the surface of the particles of silica fillers most widely used in the epoxy resin-based compositions in comparison with the other kinds of organic polymers sometimes used as a modifier of epoxy resin compositions.

Taking the above described situations into consideration, the inventors have conducted extensive investigations to obtain a modifier for epoxy resin-based curable compositions and arrived at a conclusion that a block copolymer composed, as is mentioned above, of polymeric aromatic segments and organopolysiloxane segments having a specified degree of polymerization is the most suitable with very high dispersibility in the epoxy resin and without adversely affecting the mechanical strengths and the moisture permeability of the cured products of the composition.

The base component, i.e. the component (a), is a curable epoxy resin blend composed of an epoxy resin and a curing agent therefor. The epoxy resin here implied includes those epoxy resins having at least two epoxy groups in a molecule and various kinds of commercially available epoxy resins are suitable without particular limitations on the molecular structure and molecular weight insofar as they are curable when blended with a crosslinking or curing agent. Suitable epoxy resins include, for example, those epoxy resins synthesized from epichlorohydrin and a bisphenol as well as from various kinds of novolac resins, alicyclic epoxy resins, halo- gen-, e.g. chlorine- and bromine-, containing epoxy resins and the like. The epoxy resins may be used either singly or as a combination of two kinds or more of different types according to need.

Further, certain monoepoxy compounds may be included, according to need, in combination with the component (a) above defined including, for example, styrene oxide, cyclohexene oxide, propylene oxide, methyl glycidyl ether, ethyl glycidyl ether, phenyl glycidyl ether, allyl glycidyl ether, octylene oxide, dodecene oxide and the like.

The crosslinking or curing agent as the other essential constituent of the curable epoxy resin blend as the component (a) may be one of the well known ones in the art of epoxy resins exemplified by the amine compounds such as diamino diphenyl methane, diamino diphenyl sulfone, 1,3-phenylene diamine and the like, acid anhydride compounds such as phthalic anhydride, pyromellitic anhydride, benzophenone tetracarboxylic acid anhydride and the like and novolac resins containing at least two phenolic hydroxy groups in a molecule such as phenol novolac, cresol novolac and the like.

In addition to the above described crosslinking or curing agents, it is generally preferable that, when a novolac resin or an acid anhydride is used as the crosslinking or curing agent, in particular, the inventive composition contains a curing accelerator with an object to accelerate the reaction of the epoxy resin and the crosslinking or curing agent. Suitable curing accelerators include, for example, imidazole compounds, tertiary amine compounds, phosphine compounds, cycloamidine compounds and the like.

The amount of the crosslinking or curing agent relative to the amount of the epoxy resin in the curable epoxy resin blend is not particularly limitative provided that complete curing of the epoxy resin can be obtained according to the established formulation for the epoxy resin. Exemplarily, the amount of the crosslinking or curing agent is in the range from 1 to 200 % by weight based on the amount of the epoxy resin.

As is known, it is esential in order to obtain long durability and high reliability of resin-encapsulated semiconductor devices that the intrusion of moisture is completely prevented through the cracks in the encapsulating resin and interstices between the encapsulating resin and metallic leads unavoidably formed when the encapsulating resin and the chips or frames have thermal expansion coefficients greatly differing from each other. The component (b), which is the most characteristic and essential component in the inventive composition in this regard, is the above defined block copolymer composed of at least one polymeric aromatic segment and at least one organopolysiloxane segment. When the component (b) is not the above mentioned block copolymer but is composed only of organopolysiloxane segments, various drawbacks are unavoidable including poor dispersion of the component in the composition, poor adhesion between the encapsulating resin and the chips or leads resulting in moisture intrusion, migration of the component toward the surface to cause poor reception of marking inks and segregation and inhomogenization of the components in the lapse of time. The block copolymer of this type is characteristically effective in increasing the resistance of the cured products of the resin composition against formation of cracks as the primary object of the present invention. Such an improving effect on the resistance against crack formation may be expected to a considerable extent even when the epoxy resin blend is admixed with a block copolymer composed of polymeric non-aromatic segments and organopolysiloxane segments but the block coolymer of such a type has a relatively low miscibility as an additive with the epoxy resin blend so that the additive may migrate in the article shaped of the resin composition toward the surface in the lapse of time. In contrast thereto, the aromaticity of the here proposed block copolymer serves to adequately control the miscibility of the additive with the epoxy resin blend and suppress the migration thereof in the cured products.

The aromatic polymeric segment as a part of the block copolymer essentially and basically contains at least two mono-to tetravalent aromatic groups bonded together mutually. The mono- to tetravalent aromatic group is derived from a monocyclic aromatic compound with a single benzene ring by removing one to four hydrogen atoms or substituent atoms or groups therefore directly bonded to the benzene ring. Such an aromatic group may be expressed by the formula $C_6A_m$, in which A is a hydrogen atom or a monovalent atom or group bonded to the benzene ring such as halogen atoms, hydroxy group, mercapto group, amino group, carboxyl group, isocyanato group, glycidyloxy group, substituted or unsubstituted monovalent hydrocarbon groups or hydrocarbyloxy groups having from 1 to 6 carbon atoms and m is an integer of 2 to 5 inclusive.

The hydrocarbon groups as the substituent groups on the benzene nucleus are exemplified by methyl, ethyl, propyl, tert-butyl, vinyl, allyl, phenyl and cyclohexyl groups. These hydrocarbon groups may be further substituted with other substituent atoms or groups which may contain one or more of hetero atoms such as oxygen, sulfur, silicon, nitrogen and the like.

Several of the examples of the substituent groups include alkoxy groups such as methoxy and ethoxy groups and those groups represented by the following formulas, in which R is a hydrogen atom or a monovalent hydrocarbon group having 1 to 6 carbon atoms, W is a hydroxy, alkoxy or acyloxy group and u is an integer from 0 to 6 inclusive:

$$-(-CR_2-)_u-OH; \quad -(-CR_2-)_u-SiR_2H;$$

$$-O-(-CR_2-)_{u+1}-SiR_2;$$
$$-(-CR_2-)_u-COOH;$$

$$-(-CR_2-)_u-SiR_2W;$$
$$-O-(-CR_2-)_{u+1}-SiR_2W; \quad -(-CR_2-)$$

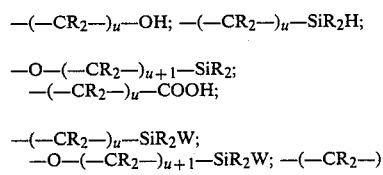

and $-O-(-CR_2-)$

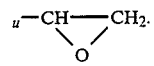

The preferable substituent groups among those expressed by the above given formulas are those terminated with a hydroxy group or an epoxy group. Namely, the aromatic segment should preferably have at least one hydroxy or epoxy group reactive with the epoxy groups in the component (a).

These mono- to tetravalent aromatic groups may be bonded mutually but preferably they are bonded together through a divalent linking group $-(-CR_2-)_r-$ as mentioned before as in a phenol novolac resin in which hydroxy-substituted aromatic groups are bonded together through a methylene group therebetween. The manner in which the aromatic groups are bonded together, optionally, through the linking groups, is not particularly limitative according to the types of the aromatic groups.

Several of the examples for the aromatic polymers to be introduced into the block copolymer as the aromatic segments are expressed by the following formulas in which A is a hydrogen atom or one of the substituent atoms or groups as above mentioned, B is a monovalent group such as vinyl, hydroxy and methoxy groups, u is an integer of 0 to 6, x and y are each an integer showing the number of repetition of the group in the square brackets and m and n are each a number of the substituent atoms or groups sufficient to satisfy the hexavalency of the benzene ring.

part of the groups $R^1$ in a molecule being optionally hydrogen atoms, and a is a positive number in the range from 1.8 to 2.7, and having from 30 to 200 silicon atoms

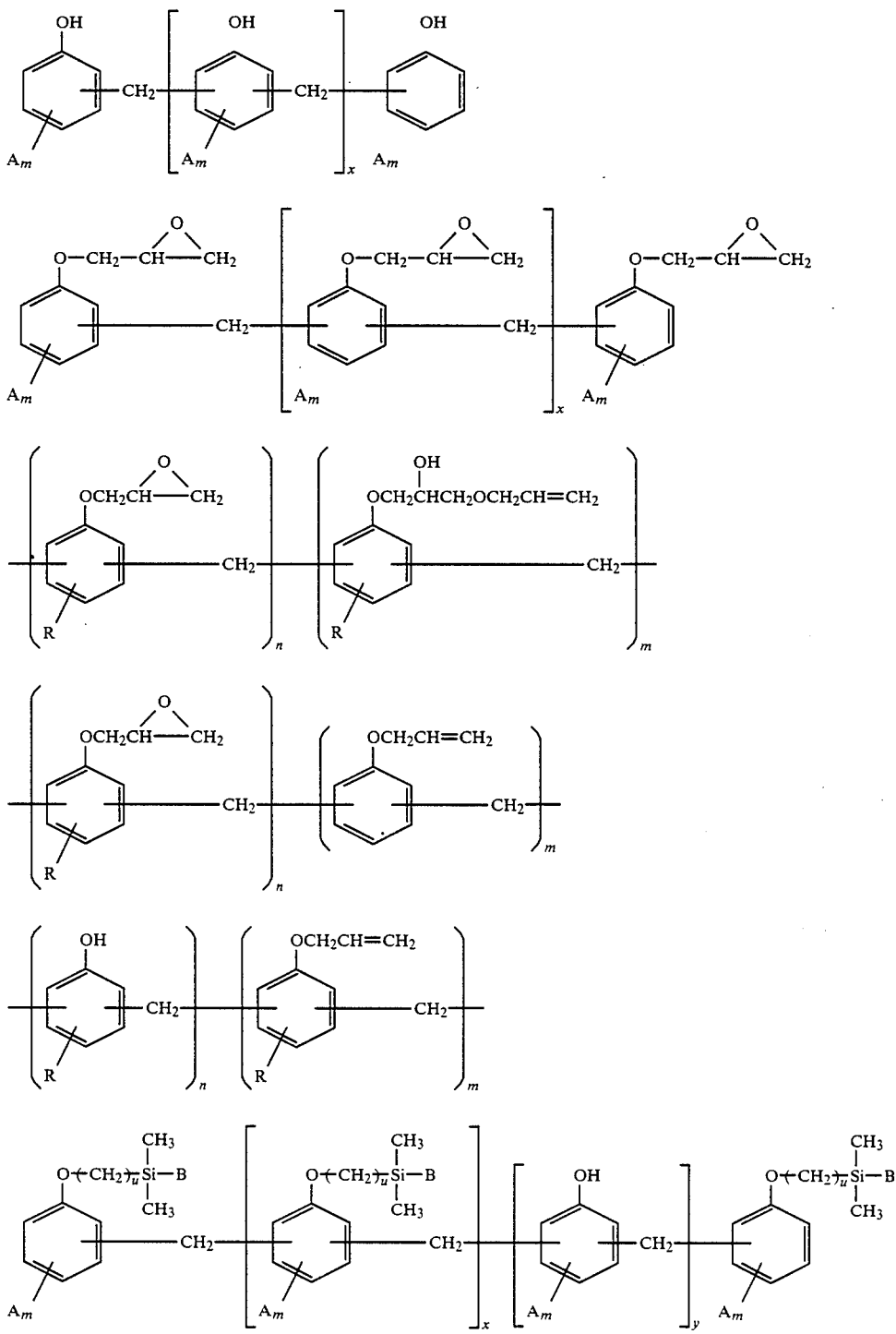

The aromatic polymeric moiety should preferably be an epoxyphenol novolac or a phenol novolac expressed by the first of the above given formulas.

The other class of the segments constituting the block copolymer together with the above described aromatic polymeric moiety is derived from the organopolysiloxane expressed by the average unit formula (I) above given, in which $R^1$ is a monovalent organic group, a in a molecule.

It is preferable that most of the monovalent organic groups in a molecule denoted by $R^1$ are substituted or unsubstituted monovalent hydrocarbon groups exemplified by methyl, ethyl, propyl, butyl, vinyl, allyl and phenyl groups as well as those groups obtained by partly replacing the hydrogen atoms in these hydrocarbon groups with halogen atoms, mercapto groups, amino groups, hydroxy groups and the like such as hydroxymethyl, N-(2-aminoethyl)aminomethyl, 3-aminopropyl, 2-mercaptoethyl, 3-mercaptopropyl, 3-cyanopropyl, hydroxyphenoxymethyl, 3-glycidyloxy propyl, 2-(3,4-epoxycyclohexyl)ethyl and the like groups. A part of the groups $R^1$ may be alkoxy groups, e.g. methoxy and ethoxy groups. Furthermore, the organopolysiloxane may contain a small number of silanolic hydroxy groups bonded to the silicon atoms.

As is mentioned above, each of the organopolysiloxane segments should have from 30 to 200 silicon atoms or, in other words, the degree of polymerization of each organopolysiloxane segment should be 30 to 200. A block copolymer prepared using an organopolysiloxane having a degree of polymerization smaller than 30 is excessively compatible with the epoxy resin so that the resultant resin composition would have a decreased glass transition temperature although the resistance against crack formation can be improved. When the degree of polymerization of the organopolysiloxane is larger than 200, on the other hand, the block copolymer is poorly miscible with the epoxy resin due to the increased molecular weight so that the block copolymer can hardly be dispersed in the epoxy resin in a fineness of, for example, 1 μm or finer and the resultant resin composition may have somewhat decresed resistance against crack formation. Thus, the above mentioned limitation of 30 to 200 is essential of the degree of polymerization of the organopolysiloxane in order to improve the resistance against crack formation without decreasing the glass transition temperature.

It is preferable that the organopolysiloxane segments may have a linear structure composed of diorganosiloxane units excepting the monofunctional terminal groups in order that the cured products of the resultant inventive composition may have a sufficiently high resistance against crack formation. Of course, small amounts of branched structures have no particular adverse effects.

The block copolymer as the component (b) in the inventive composition is obtained by reacting an aromatic polymer and an organopolysiloxane in a manner which is readily understood by those skilled in the art of organosilicon chemistry. In this case, it is preferable that the aromatic polymeric moieties and the organosiloxane moieties are bonded together each through a carbon-to-silicon linkage and not through a Si—O—C linkage. The reasons for this preference are as follows.

1. The Si—O—C linkage is less resistant than the Si—C linkage against hydrolysis to cause segregation of the organopolysiloxane moiety leading to the above mentioned drawbacks.

2. The same problem of hydrolysis is also involved in the long-term storage of an uncured composition.

3. In view of the instability of the linkage of Si—O—C, each of the ingredients is required to have a high degree of purity, in particular, in respect of water-soluble ionic impurities so that it is sometimes necessary to wash the materials with water before compounding in order to remove impurities. Such a washing treatment is naturally not free from the problem of hydrolysis.

4. The hydrolysis reaction of the Si—O—C linkages proceeds even in a cured resin composition, in particular, under a high-humidity condition to cause migration of the organopolysiloxane toward surfaces resulting in the decrease of the adhesive bonding strength which is detrimental for the long-term reliability of the encapsulated devices due to moisture intrusion.

5. As is typical in phenol silicone products, phenolic compounds are liberated by the hydrolysis reaction to cause corrosion of aluminum-made paterns on semiconductor chips due to the acidity thereof.

Several of the reactions leading to the formation of the desired block copolymer are as follows.

(1) The dehydrohalogenation reaction between a phenolic hydroxy group in the aromatic polymer and an ω-halogenoalkyl group bonded to the silicon atom in the organopolysiloxane.

(2) The platinum-catalyzed addition reaction between a vinyl or allyl group bonded to the benzene ring of the aromatic polymer and a hydrogen atom directly bonded to the silicon atom in the organopolysiloxane.

(3) The addition reaction between a glycidyloxy group bonded to the benzene ring in the aromatic polymer and a functional group reactive with the glycidylic epoxy group such as hydroxy, mercapto, carboxyl, amino and methylamino groups bonded to the silicon atom in the organopolysiloxane, preferably, through an alkylene group.

(4) The condensation reaction between a phthalic anhydride group in the aromatic polymer and an ω-aminoalkyl group bonded to the silicon atom in the organopolysiloxane to form a phthalimido structure.

It should be noted that the above given methods for the preparation of the block copolymer from an aromatic polymer and an organopolysiloxane are merely for exemplification and the block copolymers can be obtained by any other methods known in the art.

The mode in which these two classes of segments are bonded block-wise together to form the block copolymer is not limitative according to the types of the segments including a simple alternation of the two classes of segments and complicated branching of one from the other. The weight proportion of these two classes of segments in the block copolymer may be widely diversified but, usually, the block copolymer should contain from 15 to 80 % by weight of the segments derived from the organopolysiloxane. The physical or rheological property of such a block copolymer is determined depending on the degree of polymerization of the organopolysiloxane and the content of the same in the block copolymer and may be liquid, resinous or gummy.

It is further preferable that the block copolymer has one or more of functional groups reactive with the epoxy resin or the curing agent therefor in the curable epoxy resin blend as the component (a) in order to reduce the migration of the block copolymer as the additive toward the surface of the cured product of the inventive composition. The functional group in the block copolymer as the component (b) is preferably a hydroxy group or an epoxy group from the standpoint of reactivity with the epoxy resin blend as the component (a) although residual hydroxy groups directly bonded to the silicon atoms are less preferable.

The amount of the block copolymer as the component (b) in the inventive composition should be in the range from 5 to 100 parts by weight per 100 parts by weight of the curable epoxy resin blend as the component (a). When the amount of the block copolymer is smaller than above, no satisfactory improvements can be obtained in the resistance against crack formation and decreased stress in the cured products of the inventive composition while an excessive amount of the block copolymer over the above range may result in the decrease of the mechanical strengths of the cured products even though the requirements for the anti-cracking resistance and the decreased stress are fully satisfied.

Although the inventive compositions composed of the curable epoxy resin blend and the block copolymer are sufficiently of practical value for some applications, it is preferable for most of the applications that the composition is further admixed with a substantial amount of an inorganic filler. Suitable inorganic fillers include various kinds of particulate or fibrous inorganic materials known in the art of synthetic resins and rubbers, among which silica or silicate fillers are preferred.

The silica fillers above mentioned may be crystalline or non-crystalline and various commercial products are available and can be used as such. Several of the examples are finely pulverized crystalline quartz powders and amorphous silica powders having an average particle diameter of 1 to 30 μm. In particular, powders of quartz are suitable as the filler in the inventive composition and can be used in an amount of up to 1000 parts by weight per 100 parts by weight of the curable epoxy resin blend as the component (a). When the inventive composition is to be used for encapsulation of semiconductor devices, the amount of filler loading should be as high as possible due to the decreased thermal expansion from the standpoint of preventing crack formation and formation of gaps permitting intrusion of atmospheric moisture as well as distortion or stress caused on the aluminum-made patterns on the silicon substrate responsible for disorder in the performance of the device as a result of a large difference in the thermal expansion coefficients between the silicon substrate or device frame and the cured encapsulating resin composition.

Other kinds of inorganic fillers than the silica or silicate fillers may be used either as themselves or as a combination with a silica or silicate filler. Suitable inorganic fillers include, for example, talc, mica flakes, clay, kaolin, calcium carbonate, alumina, zinc oxide, aluminum hydroxide, titanium dioxide, iron oxides, glass fibers and the like. These non-silica fillers may be used in combination of two kinds or more according to need.

The siloxane linkage in the block copolymer as the component (b) is highly affinitive to the surface of these inorganic fillers or, in particular, silica fillers rendering the surface thereof hydrophobic and contributing to the improvement of the dispersibility of the filler particles in the polymeric matrix composed of the components (a) and (b). Therefore, favorable influences are effected on the properties of the cured products of the inventive composition even when the composition is loaded with a large volume of the silica filler.

The amount of the inorganic filler in the inventive composition should not exceed, preferably, 500 parts by weight per 100 parts by weight of the total amount of the components (a) and (b) since an exces-sively large amount of the inorganic filler not only can hardly be dispersed uniformly in the composition but also can give no curable composition with good workability or moldability of which cured products with satisfactory anti-cracking resistance and low internal stress are obtained. When a substantial advantageous effect is desired by the addition of the inorganic filler, in particular, the amount thereof in the inventive composition should be at least 150 parts by weight per 100 parts by weight of the components (a) and (b). That is, the amount of the inorganic filler is preferably in the range from 150 to 500 parts by weight per 100 parts by weight of the components (a) and (b).

It is of course optional that the inventive composition may contain various kinds of additives conventionally used in curable resin compositions such as, for example, fillers of the types not mentioned above including carbon black, graphite powder, wallastonite and the like, mold releasing agents including higher fatty acids, waxes and the like, coloring agents including pigments, e.g. pigment-grade carbon black, and the like, coupling agents including epoxysilanes, vinylsilanes, alkyl titanates and the like and flame retardant agents including antimony compounds and the like.

The inventive epoxy resin-based curable composition is prepared by uniformly blending the components (a), which in turn is a combination of an epoxy resin and a curing agent therefor, and the component (b) together with or without the addition of an inorganic filler and other additives in a suitable blending machine such as roller mills, kneaders, screw blenders and the like, if necessary, with application of heat to melt one or more of the components. The blending can be performed as dry but an organic solvent may be added according to need to obtain a solution-type or dispersion-type composition. The thus prepared composition can be put to practical use in diversified methods of application, for example, as a molding compound to be shaped by a known molding method such as compression molding, transfer molding, injection molding and the like. When the molding compound in a powdery or pelletized form is stored for a length of time before molding, care should be taken to avoid the influence of the moisture either from the ambient atmosphere or adsorbed on the filler particles. In this regard, the component (b) in which the aromatic segments and the organopolysiloxane segments are bonded together through a silicon-to-carbon linkage is more advantageous than those through a Si—O—C linkage which is more susceptible to hydrolysis by the moisture in the presence of the curing catalyst to isolate the organopolysiloxane in a free from detrimental to the adhesion of the cured molding composition and the devices encapsulated therewith or marking receptivity on the surface.

The cured products obtained from the inventive composition have remarkably improved resistance against crack formation and excellent electric properties as well as resistance against heat and moisture maintaining the original high glass transition temperature so that the inventive composition is very useful as an encapsulating material of semiconductor devices and as a base of coating compositions, casting material, molding compound for shaped articles, material for electric insulation as in the preparation of laminated materials and the like.

Following are the examples to illustrate the present invention in further detail preceded by the description of the preparation procedures of the block copolymers as the component (b). In the following description, the expression of "parts" always refers to "parts by weight" and the symbol Me denotes a methyl group.

Preparation 1 (Preparation of block copolymer I).

Into a four-necked flask equipped with a reflux condenser, a thermometer, a stirrer rod and a dropping funnel were introduced 200 g of a phenol novolac resin modified with allyl glycidyl ether and having a softening point of 100° C., phenol equivalent of 125 and allyl equivalent of 1100, 800 g of chloromethyloxirane and 0.6 g of cetyl trimethyl ammonium chloride and the mixture was heated at 110° C. for 3 hours under agitation. Thereafter, the mixture was cooled to 70° C. and 128 g of a 50 % aqueous solution of sodium hydroxide were added thereto dropwise over a period of 3 hours under a reduced pressure of 160 mmHg for azeotropic dehydration. The thus obtained reaction mixture was then freed from the solvent by distillation under reduced pressure and dissolved in a solvent mixture of 300 g of methyl isobutyl ketone and 300 g of acetone. The solution was washed with water and freed from the solvents by distillation under reduced pressure to give an allyl-containing epoxy resin having an allyl equivalent of 1590 and an epoxy equivalent of 190. Then, 120 g of this allyl-modified epoxy resin were reacted with 80 g of an organopolysiloxane of the formula $H-SiMe_2-O)_{100}SiMe_2-H$, Me denoting a methyl group, to give a block copolymer, referred to as the block copolymer I hereinbelow, which was a pale yellow opaque solid at room temperature, exhibiting a melt viscosity of 660 centipoise at 150° C. and weight loss of 0.40 % by heating at 150° C. for 1 hour.

Preparation 2 (Preparation of block copolymer II).

Into the same flask as used in the preceding Preparation 1 were introduced 32 g of a dimethylpolysiloxane having an average degree of polymerization of 52 and terminated at both molecular chain ends each with a silicon-bonded 3-aminopropyl group, 53 g of an epoxycresol novolac resin commercially available with a tradename of EOCN-102 from Nippon Kayaku Co., Japan, 5 g of methyl alcohol and 80 g of N,N-dimethyl formamide to form a reaction mixture which was heated for 5 hours at 100° C. with agitation to effect the addition reaction between the amino groups in the organopolysiloxane and the epoxy groups in the novolac resin. After completion of the reaction, the reaction mixture was subjected to stripping of the solvents to give a reaction product which was a transparent, light brown solid at room temperature. This product is called the block copolymer II hereinbelow. The viscosity of a 50 % solution of this product in ethyl methyl ketone was 35 centistokes at 25° C.

Preparation 3 (Preparation of block copolymers III to V).

Each of the block copolymers III to V was prepared in substantially the same manner as in Preparation 2 above by the addition reaction of a 3-aminopropyl-terminated dimethylpolysiloxane and 53 g of the same novolac resin except that the average degree of polymerization of the dimethylpolysiloxane and the amount of the same in the reaction mixture were varied as indicated in Table 1 below. The table also shows the viscosity of a 50 % solution of each of the block copolymrs in ethyl methyl ketone measured at 25° C. in centistokes.

TABLE 1

| Block copolymer No. | Dimethylpolysiloxane | | Viscosity of 50% solution in ethyl methyl ketone at 25° C., cS |
|---|---|---|---|
| | Degree of polymerization | Amount taken, g | |
| III | 10 | 16 | 15 |
| IV | 100 | 40 | 62 |
| V | 150 | 30 | 130 |

Preparation 4 (Preparation of block copolymers VI to X).

Into a four-necked flask of 500 ml capacity equipped with a reflux condenser, a thermometer, a stirrer rod and a dropping funnel were introduced a novolac resin in an amount indicated in Table 3 below, which had been prepared from a phenolic mixture composed of phenol and an allylic phenol in a molar ratio indicated in Table 3 below, the allylic phenol being 2-allyl phenol unless otherwise mentioned in the footnote to the table, 200 g of methyl isobutyl ketone and 0.05 g of a 2-ethyl-hexyl alcohol solution containing 2 % by weight as platinum of chloroplatinic acid and, after complete dissolution of the novolac resin in the solvent, the solution was azeotropically dehydrated for 1 hour followed by dropwise addition of a dimethylpolysiloxane having an average degree of polymerization, i.e. number of the silicon atoms in a molecule, as indicated in Table 3, and terminated at both molecular chain ends each with a silicon-bonded hydrogen atom in an amount also indicated in the table through the dropping funnel over a period of 20 minutes under reflux with agitation. Thereafter, the reaction mixture was further heated under reflux with agitation for additional 2 hours to effect the platinum-catalyzed addition reaction between the silicon-bonded hydrogen atoms and the allylic double bonds in the novolac resin. After completion of the reaction, the reaction mixture was washed with water and subjected to stripping of the solvent by distillation to give the desired block copolymer as the reaction product, which is called the block copolymers VI to X hereinbelow.

Table 2 gives the average degree of polymerization of the organopolysiloxane with silicon-bonded hydrogen atoms, the molar ratio of phenol to the allylic phenol to the allylic phenol in the novolac resin, the weight ratio of the organopolysiloxane to the novolac resin, the appearance of the product at room temperature, the viscosity of 50 % by weight solution of the block copolymer in ethyl methyl ketone at 25° C. and the weight loss of the block copolymer after heating for 1 hour at 150° C. for each of the copolymers VI to X.

Preparation 5 (Preparation of block copolymer XI).

Into a flask were introduced 120 g of a phenol novolac resin prepared from a 9:1 by moles mixture of phenol and

TABLE 2

| Block copolymer No. | Degree of polymerization of Si—H siloxane | Phenol/ allylic phenol molar ratio in novolac resin | Polysiloxane/ phenolic resin, g/g | Appearance | Viscosity of 50% solution in ethyl methyl ketone at 25° C., cS | Weight loss after 1 hour at 150 °C., % |
|---|---|---|---|---|---|---|
| VI | 21 | 9/1 | 30/60 | Clear, brown resin | 54 | 0.71 |
| VII | 37 | 7/3 | 50/50 | Clear, brown resin | 54 | 0.60 |
| VIII | 52 | 5/5 | 40/60 | Clear, brown resin | 48 | 0.73 |
| IX | 151 | 0/10 | 80/20 | Opaque, brown gum | 45 | 0.93 |
| | | | | Opaque, | | |

TABLE 2-continued

| Block co-poly-mer No. | Degree of poly-meriza-tion of Si—H siloxane | Phenol/ allylic phenol molar ratio in no-volac resin | Poly-silox-ane/ phenol-ic res-in, g/g | Appear-ance | Visco-sity of 50% solution in ethyl methyl ketone at 25° C., cS | Weight loss after 1 hour at 150 °C., % |
|---|---|---|---|---|---|---|
| X | 36* | 7/3 | 40/60 | brown resin | 43 | 0.70 |

*Molecular structure of the Si—H siloxane:
Me—(—SiMe$_2$—O—)$_{33}$—(—SiHMe—O—)$_2$—SiMe$_3$ 2-allylphenol, 400 g of methyl isobutyl ketone and 0.2 g of the same solution of chloroplatinic acid as used in Preparation 1 to form a reaction mixture which was heated at the refluxing temperature of the solvent followed by the dropwise addition of 82 g of a methyl-phenylpolysiloxane terminated at both molecular chain ends each with a silicon-bonded hydrogen atom and expressed by the average unit formula (SiMe$_2$O)$_{45}$-(SiMePhO)$_5$, in which Me and Ph each denote a methyl group and a phenyl group, respectively.

After the end of the dropwise addition of the methyl-phenylpolysiloxane, the reaction mixture was further agitated under reflux for additional 2 hours to effect the addition reaction between the silicon-bonded hydrogen atoms and the allylic double bonds in the novolac resin followed by the removal of the solvent by distillation to give a reaction product which is called the block copolymer XI hereinbelow. The viscosity of a 50 % solution of this product in methyl isobutyl ketone was 74 centistokes at 25° C.

Preparation 6 (Preparation of block copolymer XII).

This preparation was for comparative purpose to prepare a block copolymer in which the aromatic moieties and the siloxane moieties are bonded together through Si—O—C linkages. Thus, into a solution of 53 g of a brominated phenol novolac resin dissolved in 200 ml of ethyl methyl ketone heated with agitation at the refluxing temperature of the solvent were added dropwise 85 g of a dimethylpolysiloxane having an average degree of polymerization of 32 and terminated at both molecular chain ends each with a silicon-bonded N-ethylacetylamino group over a period of 30 minutes through a dropping funnel. After the end of the dropwise addition of the organopolysiloxane, the ethyl methyl ketone was removed by distillation and the reaction of the novolac resin and the organopolysiloxane was performed in the reaction mixture at an increased temperature of 150° C. for 5 hours under a reduced pressure of 30 mmHg. After completion of the reaction, the reaction mixture was neutralized by washing with water to give a reaction product, which was a slightly cloudy brown gummy solid at room temperature and called the block copolymer XII hereinbelow.

Preparation 7 (Preparation of block copolymer XIII).

Into a four-necked flask of 3-liter capacity equipped with a reflux condenser, a thermometer and a droppin funnel were introduced 55.4 g of a silicon-containing compound expressed by the structural formula

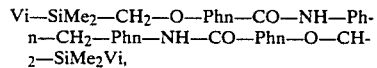

in which Me, Vi and Phn denote methyl, vinyl and 1,4-phenylene groups, respectively, 55.4 g of methyl ethyl ketone and 0.2 g of a 2 % by weight 2-ethylhex-anol solution of chloroplatinic acid and then 368.6 g of a dimethylpolysiloxane terminated at both molecular chain ends with silicon-bonded hydrogen atoms and expressed by the formula H-SiMe$_2$—O—SiMe$_2$—O)$_{48}$SiMe$_2$—H were slowly added dropwise into the mixture in the flask under reflux of the solvent. Afteer completion of the dropwise addition of the dimethyl-polysiloxane, the reaction mixture was further heated under reflux for additional 4 hours and cooled. The mixture was washed with water and freed from the solvent by distillation under reduced pressure to give a brown and highly viscous reaction product called the block copolymer XIII hereinbelow, which indicated 0.54 % of weight loss by heating at 170° C. for 1 hour.

The thus obtained block copolymer XIII had a molecular struture formed by the repetition of the unit of the formula

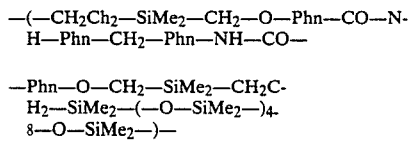

in which Me and Phn each have the meanig as defined above.

In the following examples, each of the curable epoxy resin compositions was molded into a shaped article and various properties were examined thereof to show the superiority of the inventive compositions over the comparative ones. The items examined and the testing procedures were as given below.

(1) Heat cycle test for thermal shock resistance

A 16 mm by 4.5 mm wide piece of a semiconductor silicon wafer of 0.35 mm thickness adhesively bonded to a 14-pin IC frame (42 alloy) was encapsulated by use of the resin composition by transfer molding under the molding conditions of 160° C. for 2 minutes followed by post-curing at 180° C. for 4 hours. A number of such resin-encapsulated test pieces were subjected to repeated cycles of chilling and heating, each cycle being composed of a chilling stage at −55° C. for 30 minutes immediately followed by a heating stage at 150° C. for 30 minutes, and the number of the cycles was recorded after which the number of the test pieces cracked in the resin encapsulation was or exceeded 50 % of all of the test pieces under testing.

(2) Determination of flexural strength and flexural modulus

Measurement was undertaken according to the procedure specified in JIS K 6911 with a test piece having a length of 100 mm and a 10 mm by 4 mm cross section obtained by molding the resin composition at 160° C. for 3 minutes under a pressure of 70 kg/cm$^2$ followed by post-curing at 180° C. for 4 hours.

(3) Determination of coefficient of linear thermal expansion

The measurement was undertaken with the same test pieces as used in the determination of the flexural strength according to the procedure specified in ASTM D696.

(4) Determination of glass transition temperature

A test piece having a length of 20 mm and a 4 mm square cross section was prepared by cutting from the test specimen used in the determination of the flexural strength and a dilatometric curve was measured with the test piece in a dilatometer made by Shinku Rico Co. at a rate of temperature increase of 5° C./minute. The temperature at the point of flection in the dilatometric curve was taken as the glass transition temperature.

(5) Determination of water absorption

A test piece of a disk form having a thickness of 2 mm and a diameter of 70 mm was prepared by transfer molding of the resin composition at 160° C. for 3 minutes under a pressure of 70 kg/cm$^2$ followed by post-curing at 180° C. for 4 hours and the test piece was subjected to the pressure-cooker test by heating in water in a closed vessel at 121° C. for 500 hours under a pressure of 2 atmospheres. The water absorption was given by the weight increase of the test piece thus taken out in % based on the initial weight of the test piece.

(6) Determination of internal stress in cured resin composition

A 3 mm by 3 mm wide chip of a semiconductor was imparted with piezoelectric resistance by the diffusion of a pentavalent dopant so as to have varied values of p-type electric resistance and die-bonded to a 14-pin IC frame with wire bonding of gold wires to be connected to exterior electrodes. After measuring the unstressed electric resistance, the thus prepared element was encapsulated with the resin composition by molding at 160° C. for 3 minutes under a pressure of 70 kg/cm$^2$ and the electric resistance of the piezoelectric element was again measured. The stress in the resin encapsulation was taken as represented by the percent increase (or decrease) in the thus measured resistance under stress over the initial value measured without stress.

EXAMPLE 1

Curable epoxy resin compositions, referred to as the Compositions No. 1 to No. 9, were prepared each by uniformly blending on a hot two-roller mill one of of the block copolymers, an epoxylated cresol novolac resin (EOCN 102) having an epoxy equivalent of 220, a bromainated epoxy resin (VREN-5), a phenol novolac resin having a phenol equivalent of 110, a silica filler, antimony oxide Sb$_2$O$_2$, caranuba wax, carbon black a silane coupling agent and triphenyl phosphine oxide in amounts indicated in Table 3 below, in which the components are indicated by the symbols A to J as shown below. For comparison, another composition was prepared by omitting the block copolymer.

The resin compositions were each cured and the properties of these Compositions were determined to give the results shown in the table including the glass transition temperature Tg, resistance against crack formation by heat shock in cycles, flexural strength, flexural modulus, thermal expansion coeficient and stress A: Block copolymer
B: Epoxycresol novolac resin (EOCN 102, see Example 1)
C: Brominated epoxy resin (BREN-S, a product by Nippon Kayaku Co.)
D: Phenolic resin (TD 2093, a product by Dai-Nippon Ink Chemical Co.)
E: Silica filler (RD-8, a product by Tatsumori Co.)
F: Antimony oxide Sb$_2$O$_3$ (a product by Sumitomo Kinzoku Kozan Co.)
G: Carnauba wax
H: Carbon black (A-70, a commercial product)
I: Silane coupling agent (KBM 403, a product by Shin-Etsu Chem. Co.)
J: Triphenyl phosphine (TPP, a product by Hokko Chemical Co.)

EXAMPLE 2

A mixture composed of 67.9 parts of an epoxycresol novolac resin having an epoxy equivalent of 220 sold by Nippon Kayaku Co. with a tradename of EOCN-102, 32.1 parts of a phenol novolac resin sold by Gunei Kagaku Co. with a tradename of MP-120 as a curing agent of the epoxycresol novolac resin, 25 parts of the block copolymer VI prepared in Preparation 4 above, 1.6 parts of a silane coupling agent sold by Shin-Etsu Chemical Co. with a tradename of KBM 403, 375 parts of a powder of quartz sold by Tatsumori Co., Ltd. with a tradename of 5K, 1.2 parts of a carbon black, 1.2 parts of carnauba wax and 1.3 parts of a curing accelerator sold by Shikoku Kasei Co. with a tradename of C$_{11}$Z Azine was milled into a uniform blend in a two-roller mill heated at 80 to 95° C. The thus obtained curable epoxy resin composition is called the composition No. 10 hereinbelow.

TABLE 3

| Composition No. | | 1 | 2 | 3 | 4 | 5 | 6 | 7 | 8 | 9 | Control |
|---|---|---|---|---|---|---|---|---|---|---|---|
| A | (Block copolymer) | | | | | | | | | | |
| | I | 12.5 | — | — | — | — | — | — | — | — | — |
| | VI | — | 24 | — | — | — | — | — | — | — | — |
| | VII | — | — | 20 | — | — | — | — | — | — | — |
| | VIII | — | — | — | 20 | — | — | — | — | — | — |
| | IX | — | — | — | — | 10 | — | — | — | — | — |
| | III | — | — | — | — | — | 21.6 | — | — | — | — |
| | II | — | — | — | — | — | — | 8.6 | — | — | — |
| | IV | — | — | — | — | — | — | — | 11.6 | — | — |
| | V | — | — | — | — | — | — | — | — | 13.6 | — |
| B | | 50.1 | 56.03 | 56.71 | 56.71 | 56.69 | 42.09 | 55.08 | 52.09 | 49.88 | 62.9 |
| C | | 5 | 5 | 5 | 5 | 5 | 5 | 5 | 5 | 5 | 5 |
| D | | 32.4 | 14.37 | 18.30 | 16.30 | 28.31 | 31.31 | 31.32 | 31.31 | 31.32 | 32.1 |
| E | | 260 | 260 | 260 | 260 | 260 | 260 | 260 | 260 | 260 | 260 |
| F | | 7 | 7 | 7 | 7 | 7 | 7 | 7 | 7 | 7 | 7 |
| G | | 1 | 1 | 1 | 1 | 1 | 1 | 1 | 1 | 1 | 1 |
| H | | 1 | 1 | 1 | 1 | 1 | 1 | 1 | 1 | 1 | 1 |
| I | | 1.5 | 1.5 | 1.5 | 1.5 | 1.5 | 1.5 | 1.5 | 1.5 | 1.5 | 1.5 |
| J | | 0.8 | 0.8 | 0.8 | 0.8 | 0.8 | 0.8 | 0.8 | 0.8 | 0.8 | 0.8 |
| Tg, °C. | | 167 | 142 | 158 | 165 | 168 | 148 | 163 | 165 | 165 | 169 |
| Cycles of heat shock | | 300 | 170 | 200 | 300 | 280 | 170 | 300 | 290 | 310 | 25 |

TABLE 3-continued

| Composition No. | 1 | 2 | 3 | 4 | 5 | 6 | 7 | 8 | 9 | Control |
|---|---|---|---|---|---|---|---|---|---|---|
| Flexural strength, $kg/mm^2$ | 14.0 | 13.5 | 13.2 | 13.0 | 10.5 | 14.5 | 13.5 | 12.8 | 11.5 | 14.8 |
| Flexural modulus, $kg/m^2$ | 1200 | 1350 | 1280 | 1250 | 1100 | 1400 | 1210 | 1180 | 1060 | 1500 |
| Thermal expansion coefficient, $\times 10^{-5}$ °C. | 1.7 | 2.0 | 1.9 | 1.9 | 1.8 | 2.1 | 1.7 | 1.7 | 1.7 | 2.1 |
| Stress, % | −3.2 | −3.5 | −3.4 | −3.4 | −3.2 | −3.8 | −3.2 | −3.1 | −3.1 | −4.0 |

Curable epoxy resin compositions No. 11 to No. 20 were each prepared in substantially the same manner as in the composition No. 10 above with a different formulation as indicated in Table 4 below.

In Table 4, the epoxy resins I and II are the epoxy-cresol novolac resin EOCN-120 used in the composition No. 10 and a brominated epoxy resin sold by Dow Chemical Co. with a tradename of XD-8094, respectively; the curing agents I, II and III are the phenol novolac resin MP-120 used in the composition No. 10 above, anhydride of tetrahydrophthalic acid and diaminodiphenyl methane, respectively; the lubricants I and II are the carnauba wax used in the composition No. 10 above and stearic acid, respectively: and the curing accelerators I and II are the $C_{11}Z$ Azine used in the composition No. 10 above and 2-phenyl imidazole, respectively. The silane coupling agent, i.e. KBM 403, the silica filler and the carbon black were each the same one as used in the composition No. 10. Properties of some of these compositions are given in Table 5 below.

EXAMPLE 3

Following comparative measurements were undertaken in order to further demonstrate the difference in the properties of the resin compositions prepared by formulating with the block copolymers in which the aromatic moieties and the organosiloxane moieties were bonded together through —Si—C—linkages or —Si—O—C—linkages.

Thus, the resin compositions No. 12 and No. 19 were each molded into a disk of 70 mm diameter and 2 mm thickness in the same manner as in the determination of water absorption in Example 1 and subjected to the pressure-cooker test under the same conditions for a length of time of 500 hours, during which the test specimens were periodically taken out and the weight increase was determined. The results were as shown in Table 6 below. Further, each of the test specimens after 500 hours of pressure-cooking was dried at 100° C. for 72 hours and the weight was again determined. The results were that the test specimen No. 12 gained 0.10 % of weight while the weight of the test specimen No. 19 decreased by 0.25 %.

TABLE 4

| No. | Epoxy blend Epoxy resin (parts) | Epoxy blend Curing agent (parts) | Block copolymer (parts) | KBM 403, parts | Silica filler, parts | carbon black, parts | Lubricant (parts) | Curing accelerator (parts) | Heat cycle test, cycles |
|---|---|---|---|---|---|---|---|---|---|
| 10 | I (67.0) | I (33.0) | — | 1.3 | 300 | 1.0 | I (1.0) | I (1.0) | 25 |
| 11 | I (67.9) | I (32.1) | VII (25) | 1.6 | 375 | 1.2 | I (1.2) | I (1.3) | 300 |
| 12 | I (67.9) | I (32.1) | VIII (25) | " | " | " | I (1.2) | I (1.3) | 360 |
| 13 | I (67.9) | I (32.1) | IX (25) | " | " | " | I (1.2) | I (1.3) | 280 |
| 14 | I (67.9) | I (32.1) | X (25) | " | " | " | I (1.2) | I (1.3) | 300 |
| 15 | I (68.5) | I (51.5) | VII (50.0) | " | " | " | I (1.2) | I (1.3) | 140 |
| 16 | I (49.4) | I (20.6) | VII (50) | " | " | " | I (1.2) | I (1.3) | 380 |
| 17 | I (64.5) | II (35.5) | VII (25) | " | " | " | I(1.0) II(1.5) | I (1.0) | 320 |
| 18 | I(66) II(12) | I (22) | XI (25) | 1.7 | 400 | 1.0 | I (1.3) | I (1.0) | 200 |
| 19 | I (67) | I (33) | XII (25) | 1.6 | 375 | 1.2 | I (1.2) | II (1.0) | 250 |
| 20 | I (67) | I (33) | XIII (20) | — | 350 | — | III (1.5) | II (1.0) | 150 |

TABLE 5

| No. | Flexural strength at 25° C., $kg/mm^2$ | Coefficient of linear thermal expansion, $\times 10^5$/° C. | Glass transition temperature, °C. | Water absorption, %, after 500 hours at 121° C. | Stress in molded piece, % |
|---|---|---|---|---|---|
| 10 | 14.0 | 2.8 | 175 | 0.98 | −7.0 |
| 11 | 12.0 | 2.2 | 170 | 0.78 | −4.2 |
| 12 | 10.0 | 2.1 | 170 | 0.79 | −4.0 |
| 13 | 7.0 | 2.1 | 174 | 0.75 | −4.0 |
| 14 | 12.0 | 2.3 | 170 | 0.78 | −4.0 |
| 18 | 12.0 | 2.5 | 175 | — | — |

TABLE 6

| Time of dipping, hours | 24 | 100 | 200 | 500 |
|---|---|---|---|---|
| No. 12 | 0.6% | 0.7% | 0.75% | 0.78% |
| No. 19 | 0.5% | 0.5% | 0.40% | 0.35% |

The above prepared disks of the compositions of the cured compositions were crushed and pulverized each into a powder to pass a screen of 100 mesh opening and 10 g of the powder were sealed in a glass ampule together with 50 ml of pure water and heated at 120° C. for 20 hours to effect leaching of any watersoluble matter into the aqueous solution. Then, each of the glass ampules was open and the aqueous extract was anlayzed by the infrared absorption spectrometry to give the results that the aqueous extract with the cured composition No. 19 contained a clearly detectable amount of dimethylpolysiloxane while the aqueous extract with the resin composition No. 10 contained no detectable amount of the dimethylpolysiloxane.

EXAMPLE 4

Each of the resin compositions No. 12 and No. 20 formulated with a block copolymer VIII or XIII with or without reactive groups, respectively, was compression-molded at 175° C. under a pressure of 70 kg/cm$^2$ for 2 minutes. The flexural strength and the glass transition temperature of the test specimen of No. 10 composition were as shown in Table 5 while those values for the test specimen of No. 20 composition were 10.2 kg/mm$^2$ and 157° C. The thus prepared test specimens were kept for 5 minutes in a vapor of boiling trichloroethylene and the surface condition thereof after exposure to the solvent vapor was examined with an electron microscope. The results were that the surface of the test sample with the block copolymer XIII was found to have been partially dissolved while absolutely no change was noted on the surface of the test specimen with the resin composition No. 12.

Further, acceptability of marking inks on the surfaces of these shaped bodies was examined by use of a marking ink (Marchem 7261, a product by Marchem Corp.) with which marking was made on the surface of the uncured body followed by curing by heating at 150° C. for 1 hour. The results were that the repellency of the marking ink on the surfaces was clearer on the test specimen of No. 20 than on the test specimen of No. 12.

In order to examine the adhesive strength of the marking ink to the surface of the shaped body, the marked surfaces were rubbed 10 times with a cotton applicator soaked with trichloroethylene. The results were that the marking on the test specimen of No. 20 composition had been almost completely rubbed out while almost no change was noted in the marking on the test specimen of No. 12 composition.

EXAMPLE 5

The molding resin compositions No. 12 and No. 19 were subjected to the test of the adhesive bonding strength to a semiconductor silicon chip and 42 Alloy for lead frame in semiconductor devices. Thus, a silicon chip of 10 mm by 4 mm wide and 0.5 mm thick was sanwiched on both surfaces with the molding composition which was cured as such. Separately, two lead frames of 42 Alloy each having a cross section of 6 mm by 0.15 mm and contacting at the butt ends were jointed together by embedding the 6 mm length end portion of each of them with the molding composition followed by curing thereof. Curing of the molding composition was performed at 175° C. for 2 minutes under a molding pressure of 70 kg/cm$^2$ followed by post-curing at 180° C. for 4 hours. The thus prepared test specimens of the silicon chips and lead frames bonded together with the molding composition were subjected to a tensile test by pulling apart on a tensile testing machine either with the molding composition as cured or after pressurized steaming in a water vapor at a pressure of 2.1 kg/cm$^2$G for 72 hours to give the results of the tensile force shown in Table 7 below in kg/cm$^2$ As is shown in this table, the molding composition No. 19, in which the organopolysiloxane segments are bonded throug —Si—O—C—linkages, is less reliable as an encapsulating material of semiconductor devices.

TABLE 7

| Molding composition | Pressurized steaming | Silicon chip | Lead frame |
|---|---|---|---|
| No. 12 | No | 28 | 47 |
|  | Yes | 14 | 36 |
| No. 19 | No | 27 | 46 |
|  | Yes | 0 | 18 |

What is claimed is:

1. An epoxy resin-based curable composition which comprises:
   (a) 100 parts by weight of a curable epoxy resin blend composed of an epoxy resin and a crosslinking or curing agent therefor in such a proportion as to effect curing of the epoxy resin;
   (b) from 5 to 100 parts by weight of a block copolymer having at least one hydroxyl group or epoxy group reactive with the component (a) and composed of:
   (b-1) at least one segment of a moiety of a substituted or unsubstituted epoxy novolac resin or a phenol novolac resin containing aromatic groups bonded through divalent linking units expressed by the formula —(—CR$_2$—)$_5$—, in which R is a hydrogen atom or a monovalent hydrocarbon group having 1 to 5 carbon atoms and wherein t is a positive integer from 1 to 6; and
   (b-2) at least one segment of an organopolysiloxane moiety having 37 to 200 silicon atoms in the polysiloxane linkage and expressed by the average formula R$^1_a$SiO$_{(4-a)}$/2, in which R$^1$ is a monovalent organic group, at least 70% in number of the groups R$^1$ being alkyl groups and a part of the groups R$^1$ optionally being hydrogen atoms, and a is a positive number in the range from 1.8 to 2.7, said segments (b-1) and (b-2) being bonded together through a silicon-to-carbon linkage; and
   (c) an inorganic filler in an amount of 100 to 500 % by weight based on the total amount of the components (a) and (b).

2. The epoxy resin-based curable composition as claimed in claim 1 wherein the curing agent for the epoxy resin in the curable epoxy resin blend is selected from the class consisting of amine compounds, acid anhydride compounds and novolac resins having at least two phenolic hydroxy groups in a molecule.

3. The epoxy resin-based curable compositions as claimed in claim 1 wherein the amount of the curing agent in the curable epoxy resin blend is in the range from 1 to 200 % by weight based on the epoxy resin.

4. The epoxy resin based curable composition as claimed in claim 1 wherein each of the aromatic groups in the segment of the aromatic polymeric moiety has substituent atoms or groups selected from the class consisting of halogen atoms, hydroxy group and substituted or unsubstituted monovalent hydrocarbon groups or hydrocarbyloxy groups from having 1 to 6 carbon atoms.

5. The epoxy resin-based curable composition as claimed in claim 4 the substituted hydrocarbon group or hydrocarbyloxy group has at least one substituent group selected from the class consisting of alkoxy groups and the groups represented by the general formulas $$-(-CR_2-)_u-OH; \quad -(-CR_2-)_u-SiR_2H;$$

$$-O-(-CR_2-)_{u+1}-SiR_2H;$$

$$-(-CR_2-)_u-SiR_2W;$$
$$-O-(-CR_2-)_{u+1}-SiR_2W; \quad -(-CR_2-)_u-CH\underset{O}{\overset{}{\diagdown\diagup}}CH_2;$$

and $-O-(-CR_2-)_u-CH\underset{O}{\overset{}{\diagdown\diagup}}CH_2$ in which R is a hydrogen atom or a monovalent hydrocarbon group having 1 to 6 carbon atoms, W is a hydroxy, alkoxy or acyloxy group and u is an integer from 0 to 6 inclusive.

6. The epoxy resin-based curable composition as claimed in claim 1 wherein the monovalent organic group denoted by $R^1$ in the average unit formula for the segment of the organopolysiloxane moiety of the component (b) is selected from substituted or unsubstituted monovalent hydrocarbon groups.

7. The epoxy resin-based curable composition as claimed in claim 1 wherein the segment of the organopolysiloxane moiety of the component (b) has a substantially linear molecular structure.

8. The epoxy resin-based curable composition as claimed in claim 1 wherein the weight contribution of the segments of the organopolysiloxane moiety in the block copolymer as the component (b) is in the range from 15 to 80 %.

9. The epoxy resin-based curable composition as claimed in claim 1 which further comprises a curing accelerator selected from the class consisting of imidazol compounds, cycloamidine compounds and phosphine compounds.

10. The epoxy resin-based curable composition as claimed in claim 1 which further comprises an inorganic filler in an amount not exceeding 1000 parts by weight per 100 parts by weight of the component (a).

11. The epoxy resin-based curable composition as claimed in claim 9 wherein the inorganic filler is a silica filler.

12. The epoxy resin-based curable composition as claimed in claim 10 wherein the amount of the inorganic filler is in the range from 150 to 500 parts by weight per 100 parts by weight of the component (a).

13. The epoxy resin-based curable composition as claimed in claim 1 wherein the block copolymer is prepared from a phenolic novolac resin.

* * * * *